(12) United States Patent
Boettger

(10) Patent No.: US 12,294,943 B2
(45) Date of Patent: May 6, 2025

(54) SYSTEMS, METHODS, AND DEVICES FOR ENERGY OPTIMAL RADIO LINK ADAPTATION

(71) Applicant: Apple Inc., Cupertino, CA (US)

(72) Inventor: David Boettger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 17/902,103

(22) Filed: Sep. 2, 2022

(65) Prior Publication Data

US 2024/0080762 A1    Mar. 7, 2024

(51) Int. Cl.
*H04L 1/00* (2006.01)
*H04W 52/02* (2009.01)

(52) U.S. Cl.
CPC ....... *H04W 52/0225* (2013.01); *H04L 1/0003* (2013.01); *H04W 52/0261* (2013.01)

(58) Field of Classification Search
CPC ............... H04L 1/0003; H04L 1/0009; H04W 52/0225; H04W 52/0261; Y02D 30/70
See application file for complete search history.

(56) References Cited

U.S. PATENT DOCUMENTS

| 11,251,901 B2 | 2/2022 | Alpert et al. |
| 2012/0320858 A1 | 12/2012 | Maru |
| 2020/0229206 A1* | 7/2020 | Badic .................... G05D 1/225 |

FOREIGN PATENT DOCUMENTS

| WO | 2016146058 A1 | 9/2016 |
| WO | 2016189496 A1 | 12/2016 |

* cited by examiner

*Primary Examiner* — Melvin C Marcelo
*Assistant Examiner* — Natali Pascual Peguero
(74) *Attorney, Agent, or Firm* — Eschweiler & Potashnik, LLC; Matthew W Glause

(57) ABSTRACT

The techniques described herein include provide solutions to optimizing the battery power of a user equipment (UE) though energy optimal radio link adaption. A UE may determine an energy optimal modulation and coding scheme (MCS). An energy optimal MCS may include an MCS that enables reception of a data payload at a lowest total energy consumed by a receiver. In some implementations, the MCS may be based on several factors, including time and/or data rate constraints and changes in transfer rates relative to changes in energy consumption. The UE may communicate the energy optimal MCS to a base station, and the base station may send a data payload to the UE using an energy optimal data transfer rate that is based on the energy optimal MCS.

20 Claims, 14 Drawing Sheets

SYSTEMS, METHODS, AND DEVICES FOR ENERGY OPTIMAL RADIO LINK ADAPTATION

FIELD

This disclosure relates to wireless communication networks including techniques for communicating with different wireless communication networks.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology includes procedures for enabling user equipment (UEs) and network nodes (e.g., base stations) to engage in radio link adaptation so that data transfer rates are commensurate with radio conditions and performance expectations.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
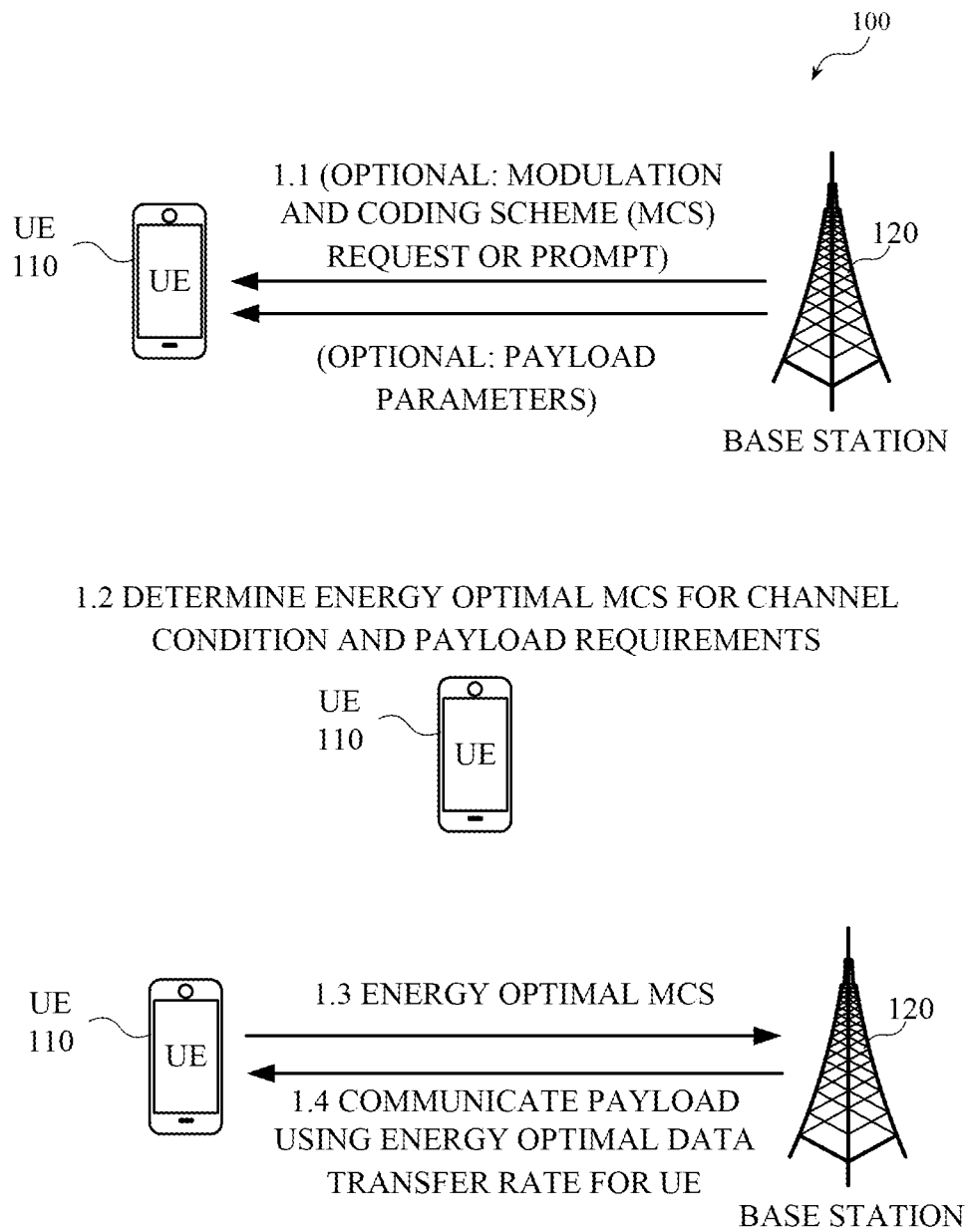
FIG. 1 is a diagram of an example overview according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless networks may include user equipment (UEs) capable of communicating with base stations, wireless routers, satellites, and other network nodes. Such devices may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). An important aspect of such technologies involves radio link adaptation, data transfer rates, and power consumption management.

The process of optimizing of data transfer parameters to cell and radio conditions may be referred to as radio link adaptation or simply link adaptation. Link adaptation may have, as its main inputs, a signal-to-noise and interference ratio (SINR) achievable on a radio link at any moment and a targeted packet error rate (PER) or block error rate (BLER). In 3rd generation partnership project (3GPP) systems, link adaptation may involve selecting an appropriate waveform modulation scheme (e.g., 64 quadrature amplitude modulation (QAM)) and a forward error correction coding (FEC) rate, for a particular payload or transport block size (TBS), together known as a modulation and coding scheme (MCS). MCS lookup tables may be used so that a given MCS index, which may be represented by an integer between 0-31, has an agreed upon meaning for the transmitter and receiver in terms of modulation scheme and FEC coding rate Lower MCS indexes may represent lower-order modulation schemes and higher FEC coding rates, which may have correspondingly lower data transfer rates. By contrast, higher MCS indexes may represent higher-order modulation schemes and lower FEC rates, which may have correspondingly higher data transfer rates. In practice, a receiver may periodically provide feedback to a transmitter about a maximum MCS (index) that the receiver can handle while still achieving a target BLER. And generally, the transmitter uses the maximum MCS to transmit data to the receiver at a highest possible rate given the radio conditions.

While transmitting data at the highest possible rate may be beneficial for spectral efficiency, it may not be optimal for receiver energy consumption—that is, the energy required by the receiver to receive the data payload (e.g., a reception energy). Additionally, the relationship between data transfer rate and energy consumed by the receiver is not necessarily linear. Indeed, a change in energy consumption between two data transfer rates (that are different by a given amount) may be different than a change in energy consumption between two other data transfer rates (that are different by the same amount).

Additionally, with the advent of 4th generation (4G) and 5th generation (5G) cellular data transfer rates (or beyond), defaulting to the fastest possible data transfer rate may not always enhance the end-user experience. For instance, some applications and services may involve data transfer delays dominated by processes unrelated to the actual data transfer rate over the cellular radio interface. Thus, it may be the case that doubling (or halving) the data rate over the cellular radio interface has no beneficial impact on the user's experience. Rather, higher data transfer rates may be less energy-efficient at the receiver than lower data rates that may have performed equally well from a user experience standpoint. That is, above a certain data transfer rate, there may be no meaningful impact to a user's experience of an application or service, and by intentionally transferring data at a slower rate than "as fast as possible," the receiver may be able to use less energy and, in the case of a mobile device, extend the device's battery life without impacting the device user's experience.

The techniques described herein provide solutions to conserving battery life of UEs though energy optimal radio link adaption. FIG. 1 is a diagram of an example overview 100 according to one or more implementations described herein. As shown, overview 100 may include UE 110 and base station 120. Base station 120 may communicate a request or prompt to UE 110 for a MCS (at 1.1). The request may be sent via radio resource control (RRC) signaling and/or downlink control information (DCI) and may correspond to downlink (DL) transmissions that base station 120 is to send to UE 110. The request or prompt, as described herein, may include an explicit or implicit request or prompt. In some implementations, the request may include, or be part of, 3GPPP standardized signaling and messaging between UE 110 and base station 120. For example, the request may be explicit or implied through 3GPPP standardized signaling and messaging. In some implementations, base station 120 may provide UE 110 with an indication of a payload, which may include an amount of data to be transferred to UE 110, a data transfer rate, etc. In some implementations, the indication of the payload may be determined or originate through mechanisms (e.g., via another channel, using Internet or web protocols, such as Hypertext Transfer Protocol (HTTP), etc.).

In response to the request, UE 110 may determine an energy optimal MCS (at 1.2). In some implementations, UE 110 may determine and send an energy optimal MCS according to an internal trigger, schedule, etc. (e.g., without a request or prompt from base station 120). An energy optimal MCS, as described herein, may include an MCS that enables reception of a data payload at a lowest total energy consumed by a receiver. In some implementations, the energy optimal MCS may be based on or constrained by channel condition, time constraints, and/or data transfer rates associated with the payload. In some implementations, an energy optimal MCS may also, or alternatively, include an MCS that enables reception of a data payload at an amount of total energy within an energy threshold of a lowest total energy. In such implementations, an energy optimal MCS may be above a lowest total energy when, for example, a small increase in energy results in a significant increase in data transfer rate.

UE 110 may communicate the energy optimal MCS to base station 120 (at 1.3). Based on the energy optimal MCS, base station 120 may select a data transfer rate that optimizes the energy consumption of UE 110 and may proceed to communicate a data payload to UE 110 using the energy optimal data transfer rate. Accordingly, since base station 120 may be configured to select a highest data transfer rate provided by UE 110 via an MCS, UE 110 may ensure that the data transfer rate selected by base station 120 is optimized to the energy consumption rates of a receiver of UE 110 by sending the base station 120 an energy optimal MCS. Additional details and examples of these and other features are described below with reference to the Figures.

Figure 2:
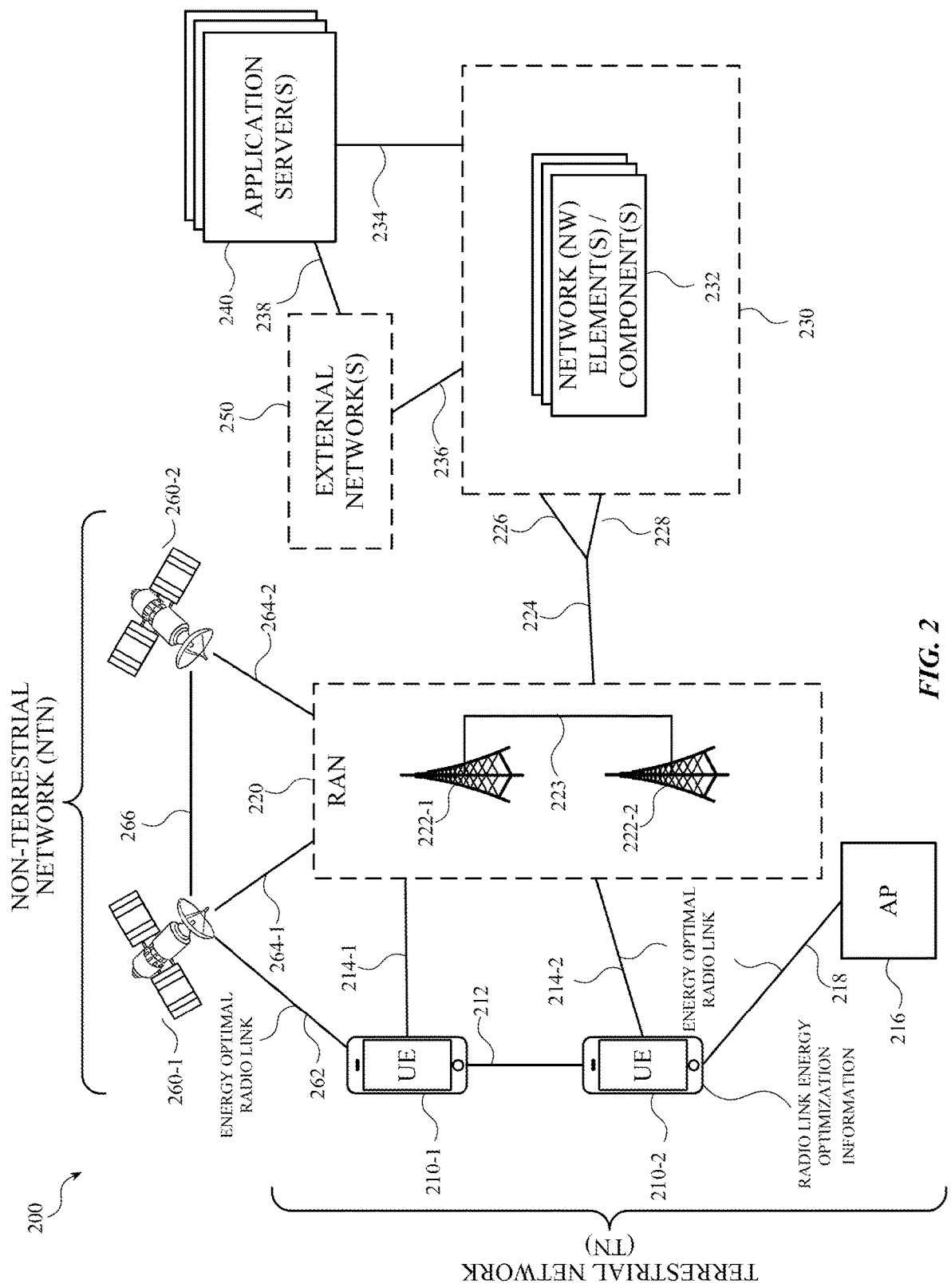
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, external networks 250, and satellites 260-1, 260-2, etc. (referred to collectively as "satellites 260" and individually as "satellite 260"). As shown, network 200 may include a non-terrestrial network (NTN) comprising one or more satellites 260 (e.g., of a global navigation satellite system (GNSS)) in communication with UEs 210 and RAN 220.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, etc. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 201, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 222.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection may comprise a local wireless connection, such as a connection consistent with any IEEE 702.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

UE 210 may store information and instructions for optimizing the power consumption of UE 210 though radio link energy optimization. The information and instructions may cause or enable UE 210 to determine an energy optimal MCS. An energy optimal MCS may include an MCS that enables reception of a data payload at a lowest total energy consumed by a receiver. In some implementations, the MCS may be based on several factors, including reception time constraints, data transfer rate constraints, and/or changes in transfer rates relative to changes in energy consumption. The information and instructions may cause or enable UE 210 to communicate the energy optimal MCS to base station 222, AP 216, and/or satellite 260, such that base station 222, AP 216, and/or satellite 260 sends a data payload to UE 210 using an energy optimal radio link or data transfer rate that is based on the energy optimal MCS.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells. As described below, in some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and also to implementation where the base station, RAN node 222, etc., is a non-terrestrial network node (e.g., satellite 260).

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RI-EMs), and the gNB-CU may be operated by a server (not shown) located in RAN 220 or by a server pool (e.g., a group of servers configured to share resources) in a similar manner as the CRAN/vBBUP. Additionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 222 may be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 may operate using licensed assisted access (LAA), eLAA, and/or feLAA mechanisms. In these implementations, UEs 210 and the RAN nodes 222 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 210 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe. To operate in the unlicensed spectrum, UEs 210 and the RAN nodes 222 may also operate using stand-alone unlicensed operation where the UE may be configured with a PCell, in addition to any SCells, in unlicensed spectrum.

The PDSCH may carry user data and higher layer signaling to UEs 210. The physical downlink control channel (PDCCH) may carry information about the transport format and resource allocations related to the PDSCH channel, among other things. The PDCCH may also inform UEs 210 about the transport format, resource allocation, and hybrid automatic repeat request (HARQ) information related to the uplink shared channel. Typically, downlink scheduling (e.g., assigning control and shared channel resource blocks to UE 210-2 within a cell) may be performed at any of the RAN nodes 222 based on channel quality information fed back from any of UEs 210. The downlink resource assignment information may be sent on the PDCCH used for (e.g., assigned to) each of UEs 210.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

As shown, example network 200 may include an NTN that may comprise one or more satellites 260-1 and 260-2 (collectively, "satellites 260"). Satellites 260 may be in communication with UEs 210 via service link or wireless interface 262 and/or RAN 220 via feeder links or wireless interfaces 264 (depicted individually as 264-1 and 264). In some implementations, satellite 260 may operate as a passive or transparent network relay node regarding communications between UE 210 and the terrestrial network (e.g., RAN 220). In some implementations, satellite 260 may operate as an active or regenerative network node such that satellite 260 may operate as a base station to UEs 210 (e.g., as a gNB of RAN 220) regarding communications between UE 210 and RAN 220. In some implementations, satellites 260 may communicate with one another via a direct wireless interface (e.g., 266) or an indirect wireless interface (e.g., via RAN 220 using interfaces 264-1 and 264-2).

Additionally, or alternatively, satellite 260 may include a GEO satellite, LEO satellite, or another type of satellite. Satellite 260 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and implementation, where the base station, RAN node 222, etc., is a non-terrestrial network node (e.g., satellite 260).

Figure 3:
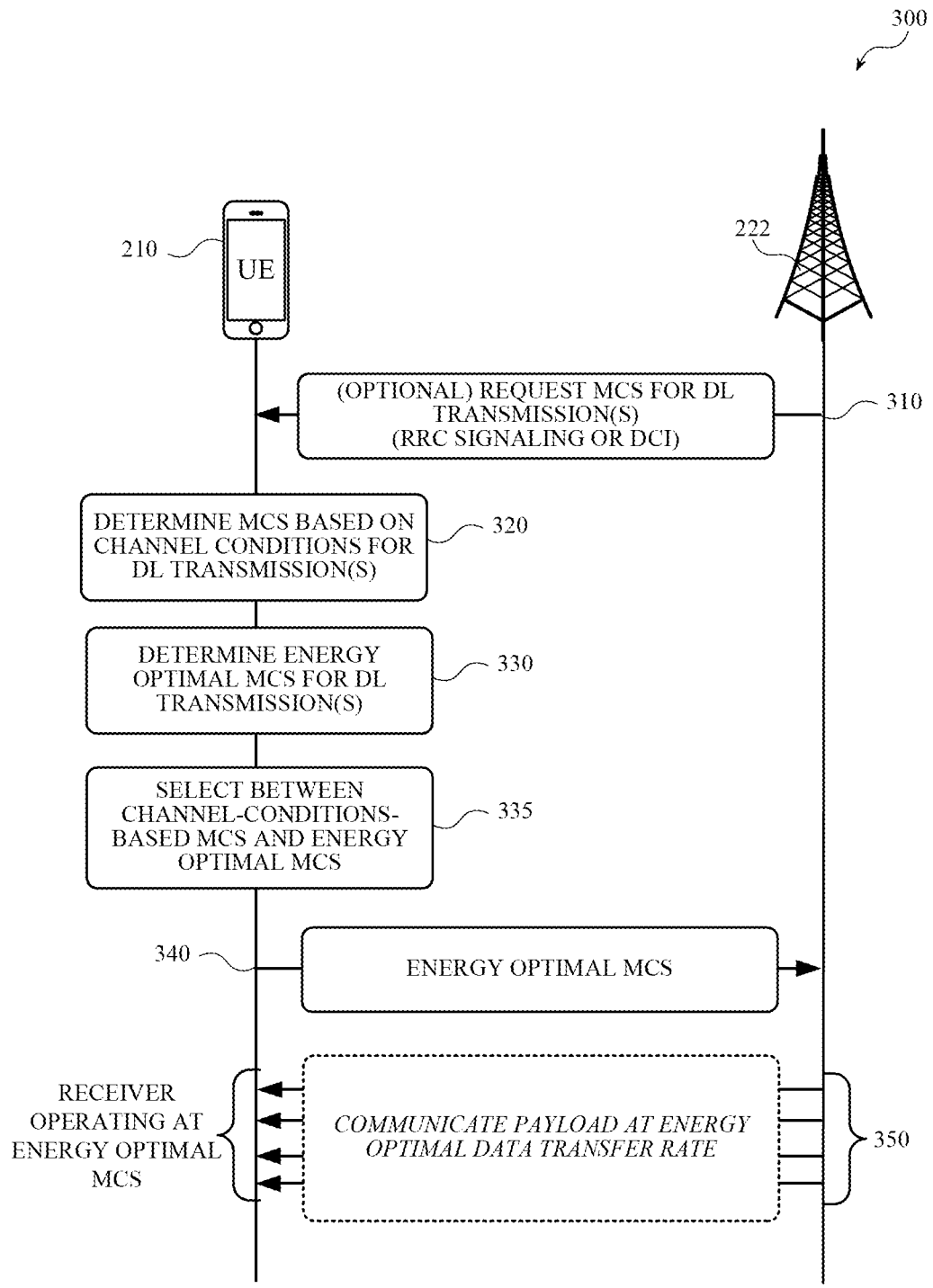
FIG. 3 is a diagram of an example process for energy optimal radio link according to one or more implementations described herein.

FIG. 3 is a diagram of an example process for energy optimal radio link according to one or more implementations described herein. Process 300 may be implemented by UE 210 and base station 222. In some implementations, some or all of process 300 may be performed by one or more other systems or devices, including one or more of the devices of FIG. 2. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Example process 300 is described below with periodic reference to FIG. 4.

As shown, process 300 may include UE 210 receiving a request or prompt, from base station 222, for an MCS for downlink (DL) transmissions (at 310). The request may be sent as RRC signaling or DCI via a PDCCH. The request or prompt may be sent via RRC signaling and/or DCI and may correspond to DL transmissions that base station 120 is to send to UE 110. The request or prompt, as described herein, may include an explicit or implicit request or prompt. In some implementations, the request may include, or be part of, 3GPPP standardized signaling and messaging between UE 110 and base station 120. For example, the request may be explicit or implied through 3GPPP standardized signaling and messaging. In some implementations, base station 120 may provide UE 110 with an indication of a payload, which may include an amount of data to be transferred to UE 110, a data transfer rate, etc. In some implementations, the indication of the payload may be determined or originate through mechanisms outside the cellular domain (e.g., via the Internet or web protocols, such as HTTP). Additionally, or alternatively, the request or prompt may include a prompt for an MCS index of an MCS table of a waveform modulation scheme (e.g., 64 QAM). In some implementations, the request or prompt may indicate a payload, time constraints, quality of service (QoS) parameters, data transfer rate expectations, etc., corresponding to the DL transmissions. In some implementations, the request may also, or alternatively, include a target BLER for the DL transmissions.

MCS may include a number of useful bits that may be carried by one symbol or resource element (RE). MCS may depend on a radio signal quality of a wireless link. Higher radio signal quality may mean a higher MCS as more useful bits may be transmitted within a symbol. By contrast, lower signal quality may mean a lower MCS, such that fewer useful bits may be transmitted within a symbol. MCS may be based on signal quality indicated by a SINR, a target BLER, etc. SINR (or signal to noise ratio (SNR)) may include a measure of signal quantity relative to signal interference and/or signal noise quantity. BLER may include a ratio of the number of transport blocks (TBs) received in error relative to the total number of blocks transmitted over a certain number of frames. BLER may be used to measure PHY layer performance and may be performed after channel de-interleaving and decoding by evaluating a cyclic redundancy check (CRC) on each transport block received. BLER may reflect radio frequency (RF) channel conditions and a corresponding level of interference. For a given modulation, the cleaner the radio channel (or higher the SNIR or SNR), the less likely a TB reception error may occur, resulting in a lower BLER. By contrast, the less clean the radio channel or lower the SNIR or SNR, the more likely a TB reception error may occur, resulting in a higher BLER.

Implementing 3GPP Standards may including using tables of physical DL shared channel (PDSCH) MCS indexes. Each table may correspond to a different QAM (e.g., 64 QAM, 256 QAM, and low spectral efficiency 64 QAM), and each may include 32 MCS indexes ranging from 0-31. Each MCS index may include an MCS index number, a modulation order, a target code rate, and a spectral efficiency, which may enable or facilitate communications between wireless network devices. Base station 222 may request UE 210 provide an MCS index from a specific MCS table using a combination of RRC signaling (e.g., a PDSCH-Config information element (IE)) and/or physical (PHY) layer signaling (e.g., via DCI and a radio network temporary identifier (RNTI) or cell RNTI (C-RNTI)). UE 210 may periodically provide feedback to base station 222, which may include a current MCS index that UE 210 may handle while still achieving the target BLER.

Process 300 may include determining an MCS, based on channel conditions, for the DL transmissions (at 320). For example, UE 210 may determine channel conditions for a data transfer from base station 222 to UE 210. Determining channel conditions may include determining a signal strength of the channel (e.g., a PDSCH) to be used for the data transfer. In some implementations, UE 210 may determine channel conditions by, for example, performing a SINR measurement procedure, SNR measurement procedure, etc., for the channel UE 210 may also, or alternatively, determine an MCS based on the channel conditions (e.g., a "channel-conditions-based MCS"). In some implementations, the channel-conditions-based MCS may be, or include, a default or standardized MCS.

Process 300 may also include determining an energy optimal MCS (at 330). For example, UE 210 may determine an energy optimal MCS based on one or more factors, such as channel conditions, signal strength, DL transmission type/payload, a target PER or BLER, energy consumption, etc. An energy optimal MCS, as described herein, may include an MCS that enables reception of a data payload at a lowest total energy consumed by the receiver. In some implementations, an energy optimal MCS may include an MCS that enables reception of a data payload at an amount of total energy within an energy threshold of a lowest total energy. In such implementations, an energy optimal MCS may be above a lowest total energy when, for example, a small increase in energy results in a significant increase in data transfer rate.

The energy optimal MCS may also be based on a measured SINR and target PER or BLER for a corresponding DL channel or DL transmission. The energy optimal MCS may correspond to an MCS index of an MCS table corresponding to a channel or DL transmission from base station 222. In typical scenarios, UEs may provide a maximum MCS index (e.g., the MCS that corresponds to a maximum data rate), and by default base station 222 may respond by transmitting data according to a maximum data transfer rate possible; however, one or more of the techniques described herein may include UE 210 providing base station 222 an energy optimal MCS instead, thus causing base station 222 to select (by default) a data transmission rate that optimizes both data reception and receiver energy consumption by UE 210.

Figure 4:
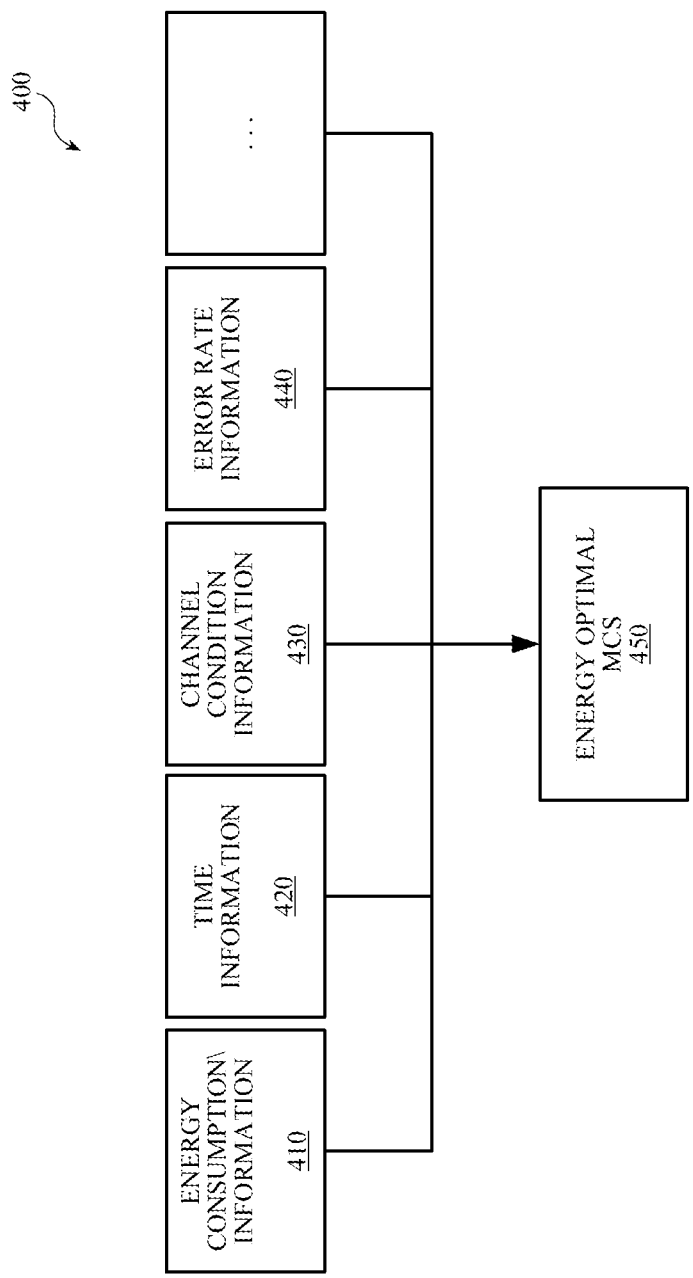
FIG. 4 is a diagram of example data structures for energy optimal link adaptation according to one or more implementations described herein.

FIG. 4 is a diagram of an example data structure 400 for energy optimal link adaptation according to one or more implementations described herein. As shown, example data structure 400 may include one or more types of information, such as energy consumption information 410, time information 420, channel condition information 430, error rate information 440, energy optimal MCS 450, and more. One or more of information 410-440 may be used by UE 210 to determine energy optimal MCS 450 for energy optimal link adaptation between UE 210 and base station 222. In some implementations, energy optimal link adaptation and/or energy optimal MCS 450 may be based on or enabled by one or more fewer, additional, or different types of information than those shown in FIG. 4.

Energy consumption information 410 may include one or more of a variety of types of information related to energy used by a receiver to receive a signal. Energy consumption information 410 may include a total amount of energy used to receive a signal and/or a rate of energy consumption used to receive a signal under a given set of conditions. Energy may refer to an amount, percentage, etc., of battery power used to receive the signal, and a receiver may be UE 210 and/or one or more components of UE 210. A set of conditions may include an MCS, a signal strength, a BLER, a PER, a data transfer rate, a QoS, etc.

Time information 420 may include one or more of a variety of types of information related to receiving data transmitted at a specified data rate or by a specified time. For example, time information 420 may include a minimum or target data transfer rate by which a payload is to be received by UE 210. Additionally, or alternatively, time information 420 may include a deadline by which a payload is to be received by UE 210. In some implementations, time information 420 may depend, at least in part, by a time-sensitivity and size of a data payload. For example, a data transfer that involves a software update may have time expectations or standards that vary from those of a data transfer that involves streaming media. In some implementations, energy consumption of battery power for UE 210 may increase or decrease depending on how fast a given data payload is to be received and/or the rate at which it is to be received.

Channel condition information 430 may include one or more of a variety of types of information related to signal strength and/or quality. Channel condition information 430 may include information determined (e.g., measured) by UE 210 and/or information provided to UE 210 by base station 222. In some implementations, channel condition information 430 may include a SNIR and/or a SNR determined by UE 210. Additionally, or alternatively, channel condition information 430 may by updated periodically, according to a preset schedule and/or in response to a trigger or request. In some implementations, energy optimal MCS may not be based on channel condition information.

Error rate information 440 one or more of a variety of types of information related to the rate at which information transmitted in a signal or channel is successfully received. Error rate information 440 may include information determined (e.g., measured) by UE 210 and/or information provided to UE 210 by base station 222. Error rate information 440 may include a BLER and/or PER. Error rate information 440 may also, or alternatively, include a target BLER and/or target PER associated with a DL transmission. For example, base station 222 may provide UE 210 with a target BLER and/or target PER associated with a radio link adaptation procedure for one or more DL transmission. UE 210 may use the target BLER and/or target PER to determine an energy optimal MCS that is appropriate for the DL transmission.

Energy optimal MCS 450 may include an MCS that enables reception of a data payload at a lowest total energy consumed by a receiver. As shown, energy optimal MCS 450 may be based on energy consumption information 410, time information 420, channel condition information 430, error rate information 440, energy optimal MCS 450, and more. For example, energy optimal MCS 450 may be based on an energy consumption rate 410 of a receiver at given data transfer rate, under certain time constraints, a measured SINR, and a target BLER. Energy optimal MCS 450 may be updated periodically, according to a preset schedule, and/or in response to a trigger or request.

Referring to FIG. 3, process 300 may include selecting between a channel-conditions-based MCS and an energy optimal MCS (block 335). For example, UE 210 may determine an MCS index corresponding to a channel-conditions-based MCS and an energy optimal MCS. UE 210 may compare the MCS indexes to determine which MCS has a lower MCS index and select the MCS with the lower MCS index. A lower MCS index may represent lower-order modulation schemes and higher FEC coding rates, which may have correspondingly lower data transfer rates. In some implementations, UE 210 may be configured with selection instructions for selecting either the energy optimal MCS or the channel-conditions-based MCS when the MCS index for each MCS is the same. In some implementations, UE 210 may also, or alternatively, be configured with selection instructions for selecting either the energy optimal MCS or the channel-conditions-based MCS when the MCS index for each MCS is within or equal to an upper bound threshold and/or a lower bound threshold of either the energy optimal MCS or the channel-conditions-based MCS. As described below, UE 210 may send the selected MCS (or selected MCS index) to base station 222. For purposes of exampling process 300, assume that UE 210 selects the energy optimal MCS. However, in some implementations, UE 210 may instead select the channel-conditions-based MCS.

Process 300 may include communicating an energy optimal MCS (at 340). For example, UE 210 may transmit an energy optimal MCS to base station 222 in response to receiving a request for a MCS for one or more DL transmissions or channels. UE 210 may do so by sending an MCS index, corresponding to the energy optimal MCS, to base station 222. In some implementations, the energy optimal MCS may be communicated via an RRC signaling and/or a PHY layer procedure (e.g., via a control channel (e.g., a physical uplink (UL) control channel (PUCCH), and/or a physical UL shared channel (PUSCH)). In some implementations, UE 210 may provide an energy optimal MCS as part of UE capability information.

Process 300 may include communicating using the energy optimal MCS (at 350). For example, in response to receiving an energy optimal MCS from UE 210, base station 222 may proceed to select an MCS corresponding to the energy optimal MCS from UE 210 and communicate a data payload to UE 210 using one or more DL transmissions. Accordingly, energy optimal link adaptation, as described herein, may include UE 210 determining an energy optimal MCS for receiving DL transmissions, providing the energy optimal MCS to base station 222, and receiving a corresponding data payload according to the energy optimal MCS.

Figure 5:
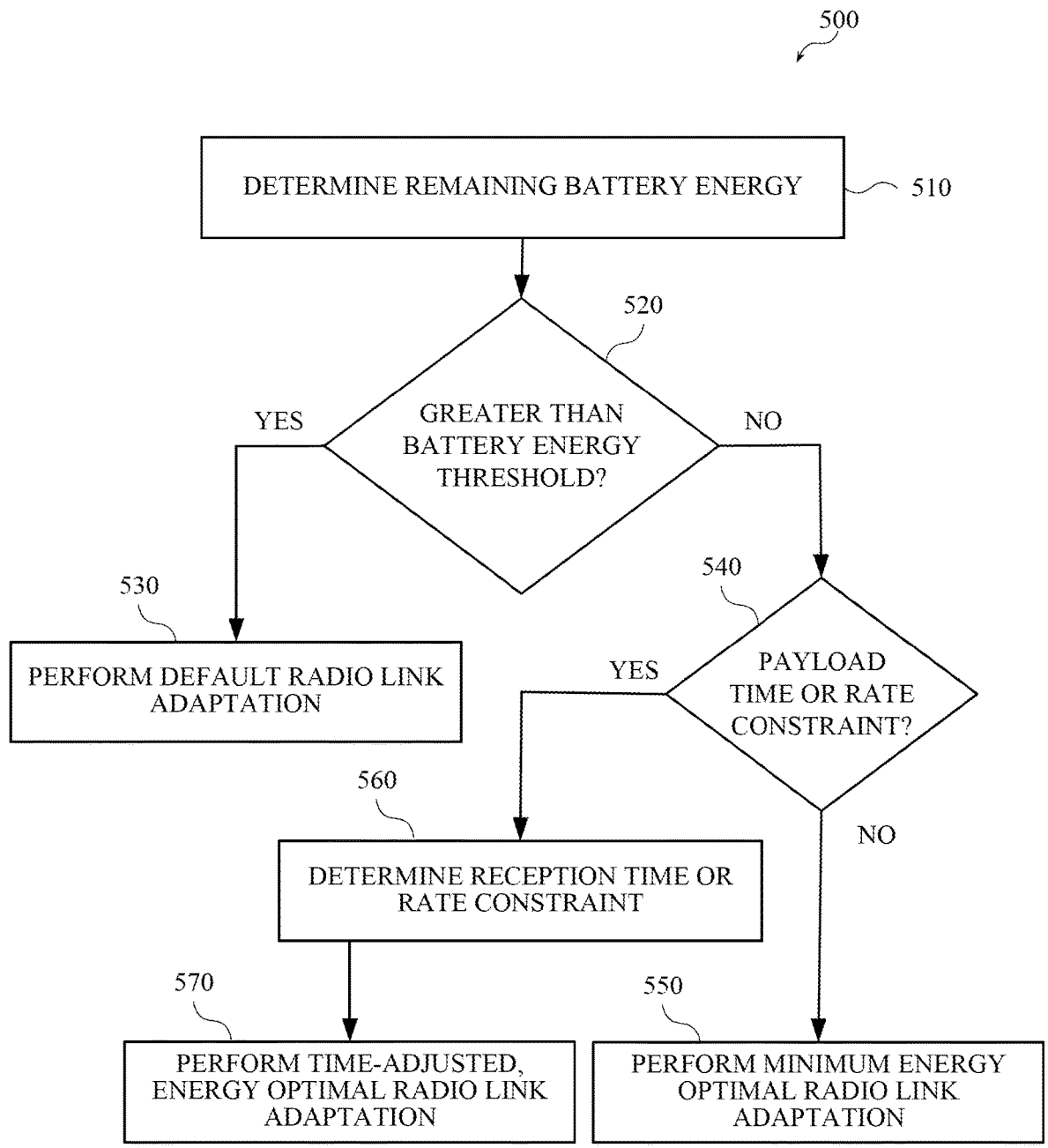
FIG. 5 is a diagram of an example process for dynamically performing energy optimal radio link adaptation according to one or more implementations described herein.

FIG. 5 is a diagram of an example process for dynamically performing energy optimal radio link adaptation according to one or more implementations described herein. Process 500 may be implemented by UE 210. In some implementations, some or all of process 500 may be performed by one or more other systems or devices, including one or more of the devices of FIG. 5. Additionally, process 500 may include one or more fewer, additional, differently ordered and/or arranged operations than those shown in FIG. 5. In some implementations, some or all of the operations of process 500 may be performed independently, successively, simultaneously, etc., of one or more of the other operations of process 500. As such, the techniques described herein are not limited to a number, sequence, arrangement, timing, etc., of the operations or process depicted in FIG. 5. Example process 500 is described below with periodic reference to FIGS. 6-8.

As shown, process 500 may include determining a remaining battery energy (510). For example, UE 210 may determine and/or estimate an amount of battery energy remaining in a power supply or battery of UE 210. In some implementations, UE 210 may compare the remaining battery energy to a battery energy threshold amount. The battery energy threshold amount may be fraction or percentage of the battery energy when fully charged. In some implementations, the battery energy threshold may vary based on one or more factors, such as a time of day, day of the week, date, month, time of year, type of payload, an application or process corresponding to the payload, a channel condition, etc. When the remaining battery energy is greater than the battery energy threshold (block 520—YES), UE 210 may proceed by performing a standardized or default radio link adaptation (block 530). A standardized or default radio link adaptation may include, for example, determining an MCS corresponding to a maximum data transfer rate available (e.g., based on UE capabilities, an MCS table, channel conditions, etc.) and communicating the MCS to base station 222.

Figure 6:
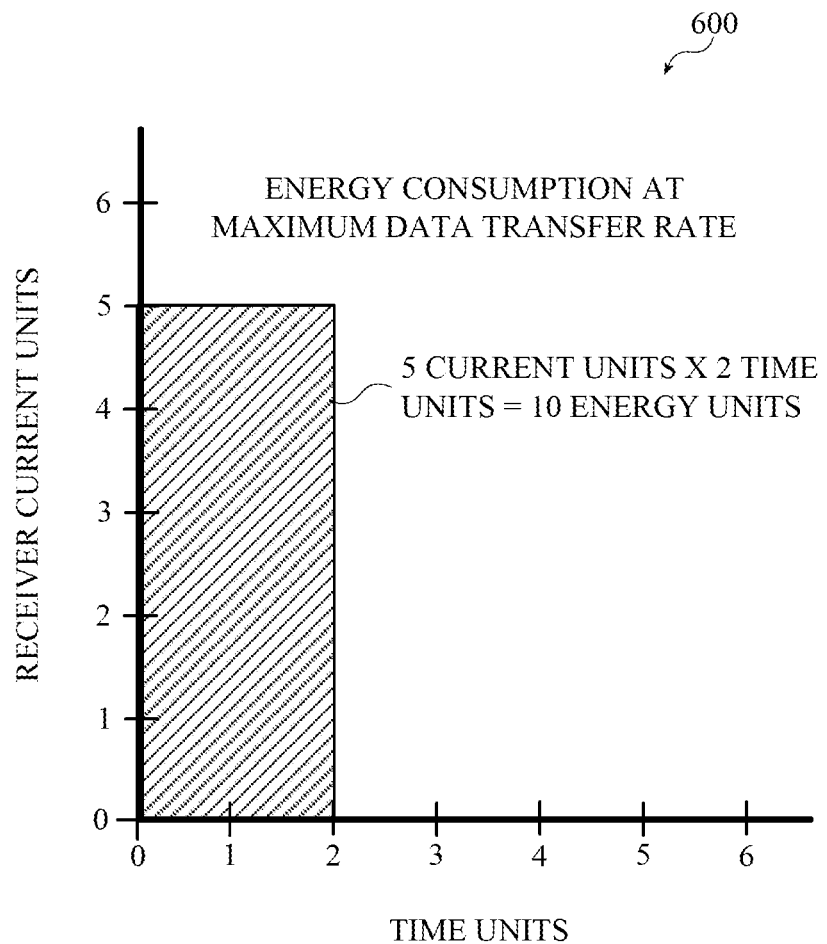
FIG. 6 is a diagram of an example table of energy consumption of a maximum data transfer rate link adaptation according to one or more implementations described herein.

FIG. 6 is a diagram of an example table 600 of energy consumption of a maximum data transfer rate link adaptation according to one or more implementations described herein. As shown, example table 600 may include receiver current units along a vertical axis and time units along a horizontal axis. For purposes of explaining FIG. 6, assume that the receiver current units and time units have been normalized so they may be charted to represent the energy units consumed in receiving a given payload at maximum data transfer rate. As shown, at a maximum data transfer rate, UE 210 may consume 5 current units for each of 2 time units for a total of 10 energy units. As such, one or more of the energy optimal radio link adaption techniques described herein may provide for standardized or default radio link adaptation under certain circumstances, such as when UE 210 has plenty of remaining battery energy.

Referring to FIG. 5, when the remaining battery energy is not greater than the battery energy threshold (block 520—NO), UE 210 may proceed by determining whether the corresponding radio link adaptation procedure involves a payload time or rate constraint (block 540). A UE 210 may be made aware of a payload via RRC signaling, DCI, etc., which may indicate a data type, data priority, data transfer rate, QoS, amount of data to be received by a particular time or deadline, amount of data to be received over a series of time periods, and/or one or more other characteristics relating to a payload time or rate constraint (e.g., when the payload is to be received by UE 210).

When the radio link adaptation procedure does not involve a payload time or rate constraint (block 540—NO), UE 210 may proceed by performing a minimum energy optimal radio link adaptation procedure (block 570). A minimum energy optimal radio link adaptation procedure may include determining an energy optimal MCS (or minimum energy optimal MCS), where reception of the data payload is set to a lowest total energy consumed by UE 210 (regardless of time, data transfer rate, etc.). When the payload size is not known (block 540—NO), UE 210 may proceed by performing a minimum energy optimal radio link adaptation procedure (block 570).

Figure 7:
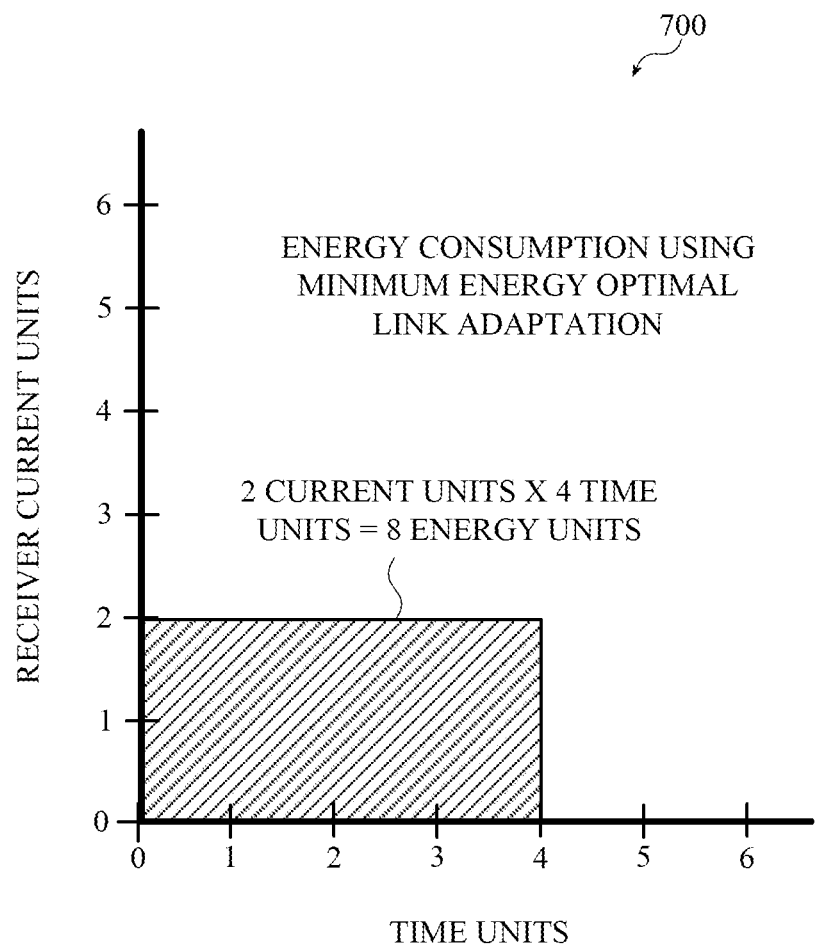
FIG. 7 is a diagram of an example table of energy consumption of an energy optimal link adaptation according to one or more implementations described herein.

FIG. 7 is a diagram of an example table 700 of energy consumption of an energy optimal link adaptation according to one or more implementations described herein. As shown, example table 700 may include receiver current units along a vertical axis and time units along a horizontal axis. For purposes of explaining FIG. 7, assume that the receiver current units and time units have been normalized so they may be charted to represent the energy units consumed in receiving a given payload at a minimum energy optimal data transfer rate. Assume also that the amount of data to be transferred in FIG. 7 is the same as FIG. 6. As shown, at a minimum energy optimal data transfer rate, UE 210 may consume 2 current units for each of 4 time units for a total of only 8 energy units, which is 2 energy units less than the example of FIG. 6. As such, the energy optimal radio link adaption techniques described herein may enable a minimum energy optimal data transfer rate under certain circumstances, such as when a battery energy of UE 210 is below a threshold and a payload is not constrained by time and/or transfer rates.

Referring to FIG. 5, when the radio link adaptation procedure does involve a payload time or rate constraint (block 540—YES), UE 210 may proceed by determining the reception time or rate constraint (block 560). UE 210 may also, or alternatively, perform a time-adjusted, energy optimal radio link adaptation procedure. A time-adjusted, energy optimal radio link adaptation procedure may include determining an energy optimal MCS consistent with the time and/or rate constraint. In contrast to the minimum energy optimal radio link adaptation procedure describe above, the energy optimal MCS of a time-adjusted, energy optimal radio link adaptation procedure (or time-adjusted, energy optimal MCS) may involve more energy as a higher data transfer rate may be required to satisfy the data transfer time and/or rate constraint.

Figure 8:
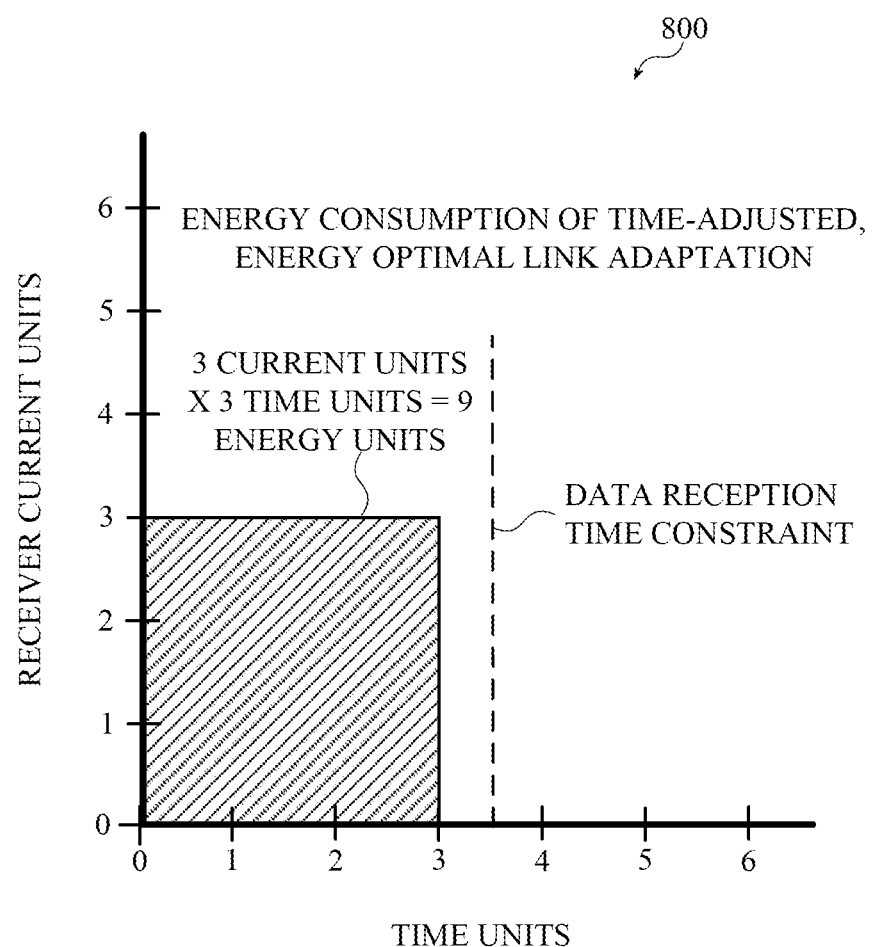
FIG. 8 is a diagram of an example table of energy consumption of an energy optimal link adaptation with a time constraint according to one or more implementations described herein.

FIG. 8 is a diagram of an example table 800 of energy consumption of an energy optimal link adaptation with a time constraint according to one or more implementations described herein. As shown, example table 800 may include receiver current units along a vertical axis, time units along a horizontal axis, and a data reception time constraint. The data reception time constraint may represent a deadline by which a payload is to be received. For purposes of explaining FIG. 8, assume that the receiver current units and time units have been normalized so they may be charted to represent the energy units consumed in receiving a given payload at a minimum energy optimal data transfer rate. Assume also that the amount of data to be transferred in FIG. 8 is the same as FIGS. 6-7. As shown, at a time-adjusted, energy optimal data transfer rate, UE 210 may consume 3 current units for each of 3 time units for a total of only 9 energy units, which is 1 energy unit less than the example of FIG. 6 and 1 energy unit more than the example of FIG. 7. As such, the energy optimal radio link adaption techniques described herein may enable a time-adjusted, energy optimal data transfer rate under certain circumstances, such as when a battery energy of UE 210 is below a threshold and a payload is constrained by time and/or transfer rates.

Figure 9:
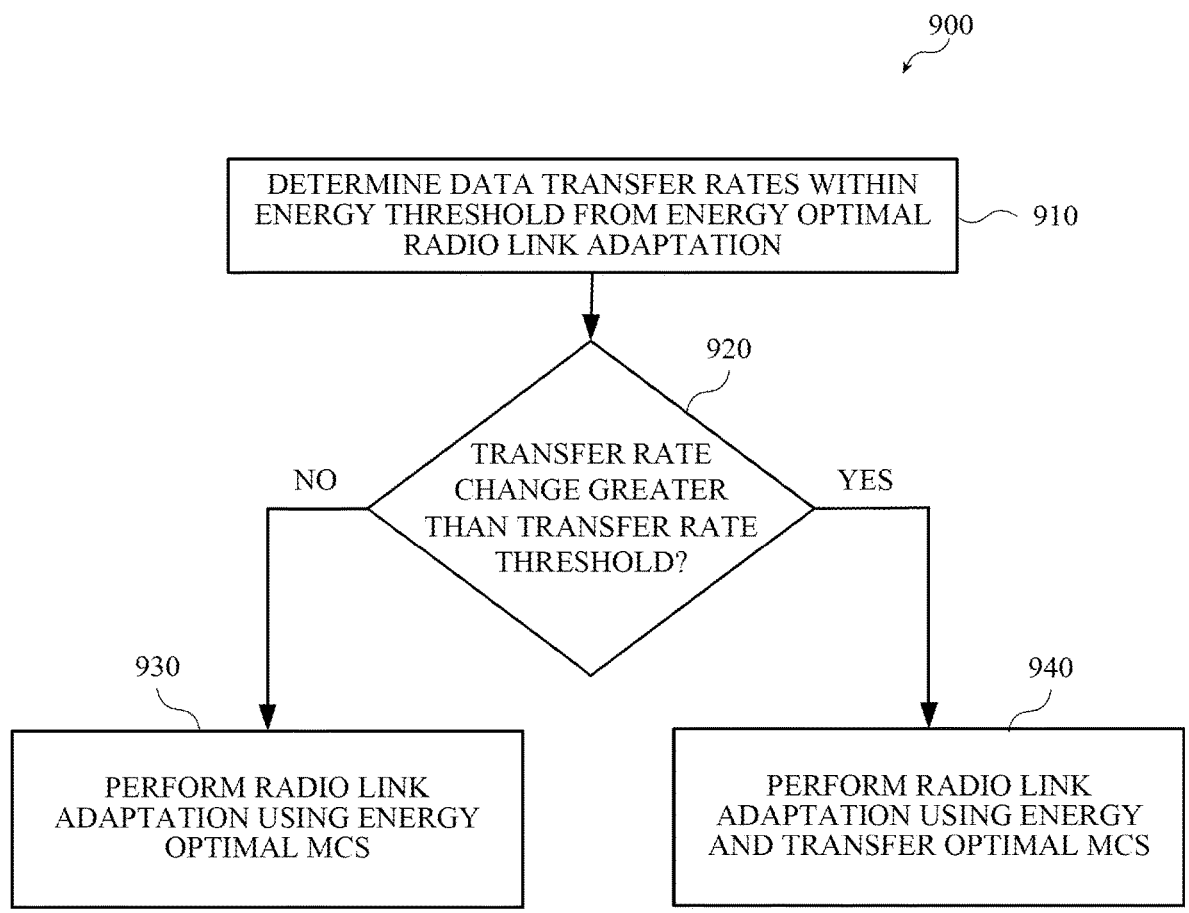
FIG. 9 is a diagram of an example process for dynamically performing optimal energy and transfer rate radio link adaptation according to one or more implementations described herein.

FIG. 9 is a diagram of an example process 900 for dynamically performing optimal energy and transfer rate radio link adaptation according to one or more implementations described herein. Process 900 may be implemented by UE 210. In some implementations, some or all of process 900 may be performed by one or more other systems or devices, including one or more of the devices of FIG. 9.

Additionally, process 900 may include one or more fewer, additional, differently ordered and/or arranged operations than those shown in FIG. 9. In some implementations, some or all of the operations of process 900 may be performed independently, successively, simultaneously, etc., of one or more of the other operations of process 900. As such, the techniques described herein are not limited to a number, sequence, arrangement, timing, etc., of the operations or process depicted in FIG. 9.

As shown, process 900 may include determining within an energy threshold from an energy optimal radio link adaptation (block 910). For example, UE 210 may determine an energy optimal MCS for radio link adaption. The energy optimal MCS may include an MCS that enables reception of a data payload at a lowest total energy consumed by a receiver. In some implementations, the energy optimal MCS may include a data transfer rate that is equal to a data transfer rate required by a particular DL transfer, communication, application, service, etc. In some implementations, the energy optimal MCS may include a data transfer rate that greater than a data transfer rate required by a particular DL transfer, application, service, etc.

UE 210 may be configured with an energy consumption threshold that includes an amount of receiver energy consumption above the energy optimal MCS at the point of lowest total energy consumed for the DL transfer, application, service, etc. UE 210 may determine or map a change in the transfer rate for DL transfer, application, service, etc., between the point of lowest total energy consumed and the energy consumption threshold. UE 210 may further determine whether the marginal increase in energy consumption, within the energy consumption threshold, results in a change in data rate transfer that is greater than a transfer rate threshold. In other words, UE 210 may determine whether a small or threshold increase in energy consumption results in a data transfer rate increase that is worth the increase in energy consumption.

When a change in the transfer rate is not greater than a transfer rate threshold (block 920—NO), UE 210 may proceed by performing radio link adaptation using an energy optimal MCS. That is, UE 210 may use the energy optimal MCS at the point of lowest total energy consumed for the DL transfer, application, service, etc. When a change in the transfer rate is greater than a transfer rate threshold (block 920—YES), UE 210 may proceed by performing radio link adaptation using an energy and transfer optical MCS (block 940). That is, an MCS that balances energy consumption with data transfer rate. Accordingly, one or more of the energy optimal radio link adaption techniques described herein may balance energy consumption optimization with data transfer rate optimization to address non-linear relationships between receiver energy consumption and data transfer rates. Further explanation and examples of process 900 are described below with reference to FIGS. 10-12.

Figure 10:
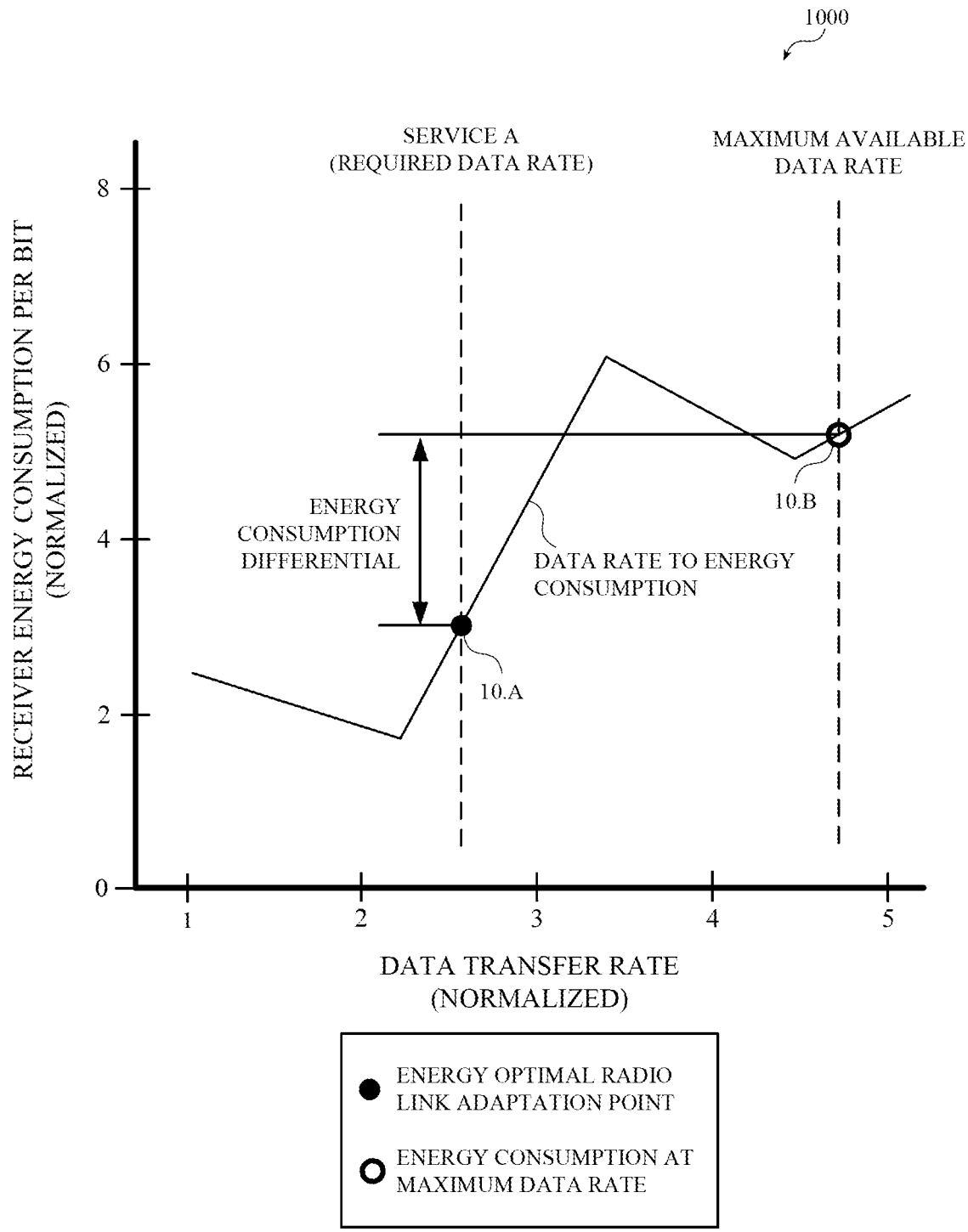
FIG. 10 is a diagram of an example table of an energy consumption differential between a maximum available data transfer rate and an energy optimal radio link adaptation according to one or more implementations described herein.

FIG. 10 is a diagram of an example table 1000 of an energy consumption differential between a maximum available data transfer rate and an energy optimal radio link adaptation according to one or more implementations described herein. As shown, example table 1000 may include receiver energy consumption per bit (e.g., receiver energy consumption rates) along a vertical axis and data transfer rates along a horizontal axis. For purposes of explaining FIG. 10, assume that vertical axis units and horizontal axis units have been normalized so they may be charted to represent a non-linear change in energy consumption rates relative to a change in data transfer rates. FIG. 10 also includes a data transfer rate required by a particular service (Service A) and a maximum data transfer rate available to UE 210. The energy optimal radio link adaptation solutions, described herein, may enable UE 210 to provide base station 222 with an energy optimal MCS, such that DL communications for service A use the lower data transfer rate and energy consumption of point 10.A instead of the higher data transfer rate and energy consumption of point 10.A.

Figure 11:
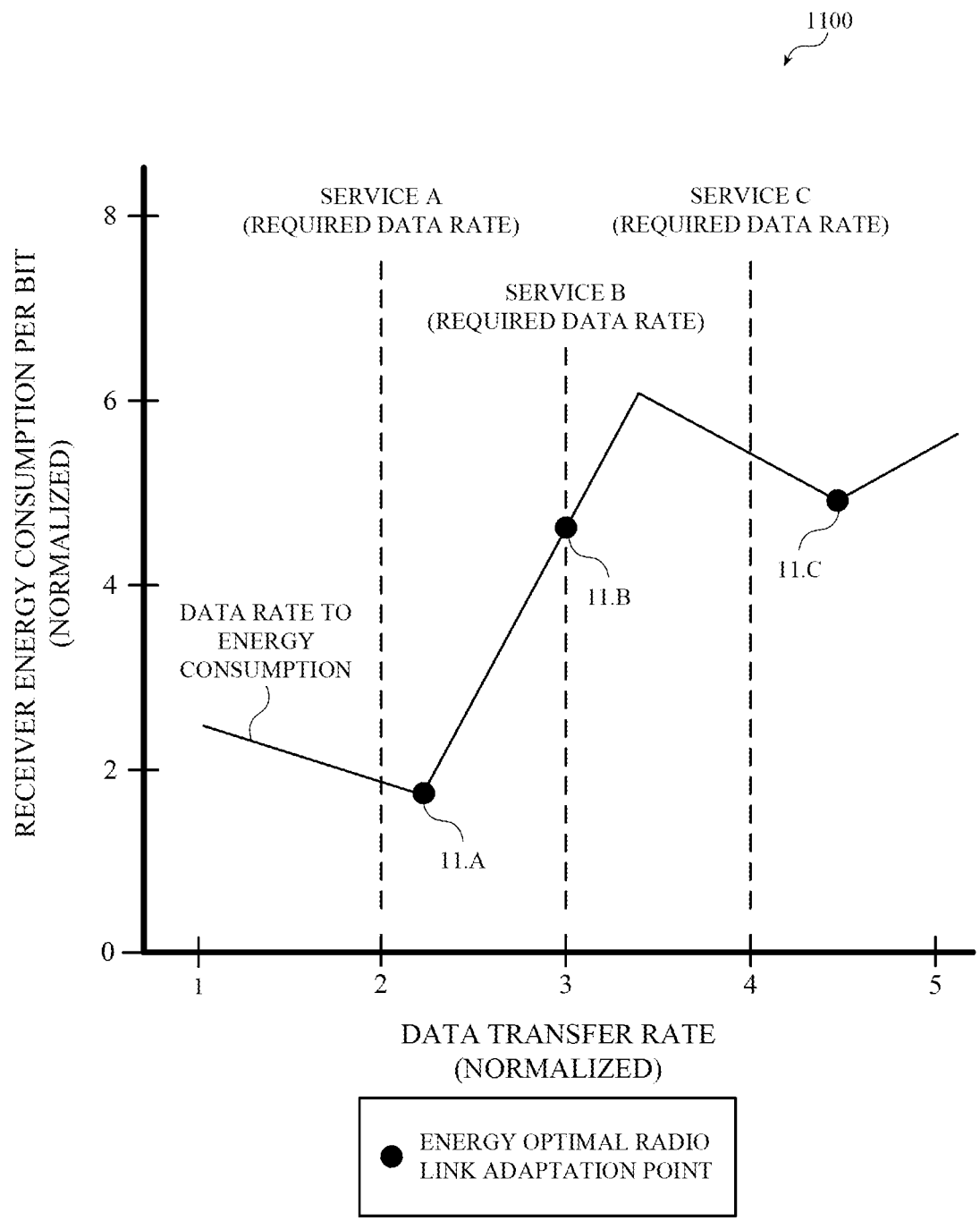
FIG. 11 is a diagram of an example table of energy optimal radio link adaptations for different services according to one or more implementations described herein.

FIG. 11 is a diagram of an example table 1100 of energy optimal radio link adaptations for different services according to one or more implementations described herein. As shown, example table 1100 may include receiver energy consumption per bit (e.g., receiver energy consumption rates) along a vertical axis and data transfer rates along a horizontal axis. For purposes of explaining FIG. 11, assume that vertical axis units and horizontal axis units have been normalized so they may be charted to represent a non-linear change in energy consumption rates relative to a change in data transfer rates. FIG. 11 also includes a data transfer rate required by service A, service B, and service C. The energy optimal radio link adaptation solutions, described herein, may enable UE 210 to provide base station 222 with an energy optimal MCS for service A, service B, and service C according to energy optimal radio link adaptation points 11.A, 11.B, and 11.C, respectively. As shown, UE 210 may therefore receive payloads from base station 222 for services A and C, at a lowest energy consumption point and a greater data transfer rate than required by services A and C. The payload for service B may be at a lowest energy consumption point and a lowest data transfer rate required.

Figure 12:
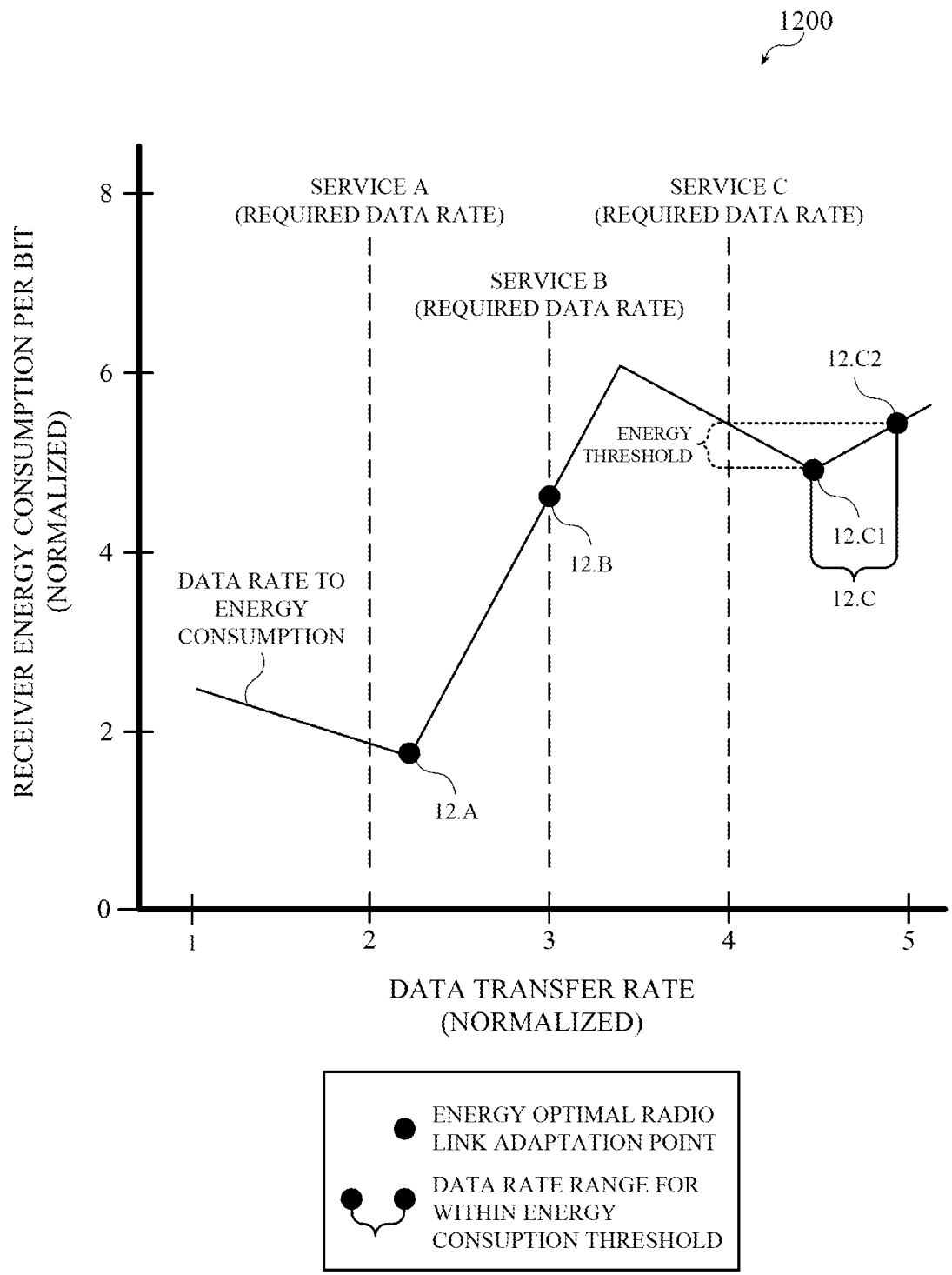
FIG. 12 is a diagram of an example table of energy optimal radio link adaptations using an energy consumption threshold and corresponding data transfer rates according to one or more implementations described herein.

FIG. 12 is a diagram of an example table 1200 of energy optimal radio link adaptations using an energy consumption threshold and corresponding data transfer rates according to one or more implementations described herein. As shown, example table 1200 may include receiver energy consumption per bit (e.g., receiver energy consumption rates) along a vertical axis and data transfer rates along a horizontal axis. For purposes of explaining FIG. 12, assume that vertical axis units and horizontal axis units have been normalized so they may be charted to represent a non-linear change in energy consumption rates relative to a change in data transfer rates. FIG. 12 also includes a data transfer rate required by service A, service B, and service C. The energy optimal radio link adaptation solutions, described herein, may enable UE 210 to provide base station 222 with an energy optimal MCS for service A, service B, and service C according to energy optimal radio link adaptation points 12.A, 12.B, and either 12.C1, 12C2, or somewhere therebetween. At point 12.A, UE 210 may receive a payload from base station 222 for service A at a lowest energy consumption point and a higher data transfer rate than required by service A.

At 12.B, the payload for service B may be a lowest energy consumption point and a lowest data transfer rate required. Referring to 12.C, in some implementations, UE 210 may apply an energy threshold (or energy consumption rate threshold) measured from the lowest energy consumption rate of point 12.C1 to an upper energy consumption rate of point 12.C2 within the energy consumption rate threshold. UE 210 may map or determine a change data transfer rate relative to the change in energy consumption rates between the lowest energy consumption rate of point 12.C1 and the upper energy consumption rate of point 12.C2. UE 210 may compare the determined consumption-to-transfer changes to a consumption-to-transfer threshold (e.g., an energy threshold). A consumption-to-transfer change may include a change between the energy consumption rate and a data transfer rate at one point (e.g., 12.C1) relative to a change between the energy consumption rate and a data transfer rate at another point (e.g., 12.C2) along a non-linear, data rate to energy consumption performance graph of a receiver.

When a determined consumption-to-transfer change (e.g., change between 12.C1 and 12.C2) does not exceed the consumption-to-transfer threshold, UE 210 may proceed with radio link adaptation using the lowest energy consumption point that satisfies the required data transfer rate (e.g., 12.C1). A consumption-to-transfer threshold may include a threshold amount of change between different energy consumption and data transfer rates at different points (e.g., 12.C1 and 12.C2). In other words, consumption-to-transfer threshold may help measure whether an increase in a data transfer rate is large enough to be "worth" the increase in a corresponding increase in an energy consumption rate.

By contrast, when a determined consumption-to-transfer change (e.g., 12.C1 to 12.C2) exceeds the consumption-to-transfer threshold, UE 210 may proceed to perform radio link adaptation using optimal energy and transfer rate radio link adaptation (e.g., 12.C2). In some implementations, UE 210 may implement optimal energy and transfer rate radio link adaptation in certain scenarios and/or conditions. For example, UE 210 may implement optimal energy and transfer rate radio link adaptation on an application- or service-specific basis, on a request-only basis, under certain channel conditions (e.g., an SNIR or SNR above or below an SNIR or SNR threshold), for DL transfers with certain time constraints or data transfer rates, for DL transfers with a target BLER above or below a BLER threshold, etc.

Figure 13:
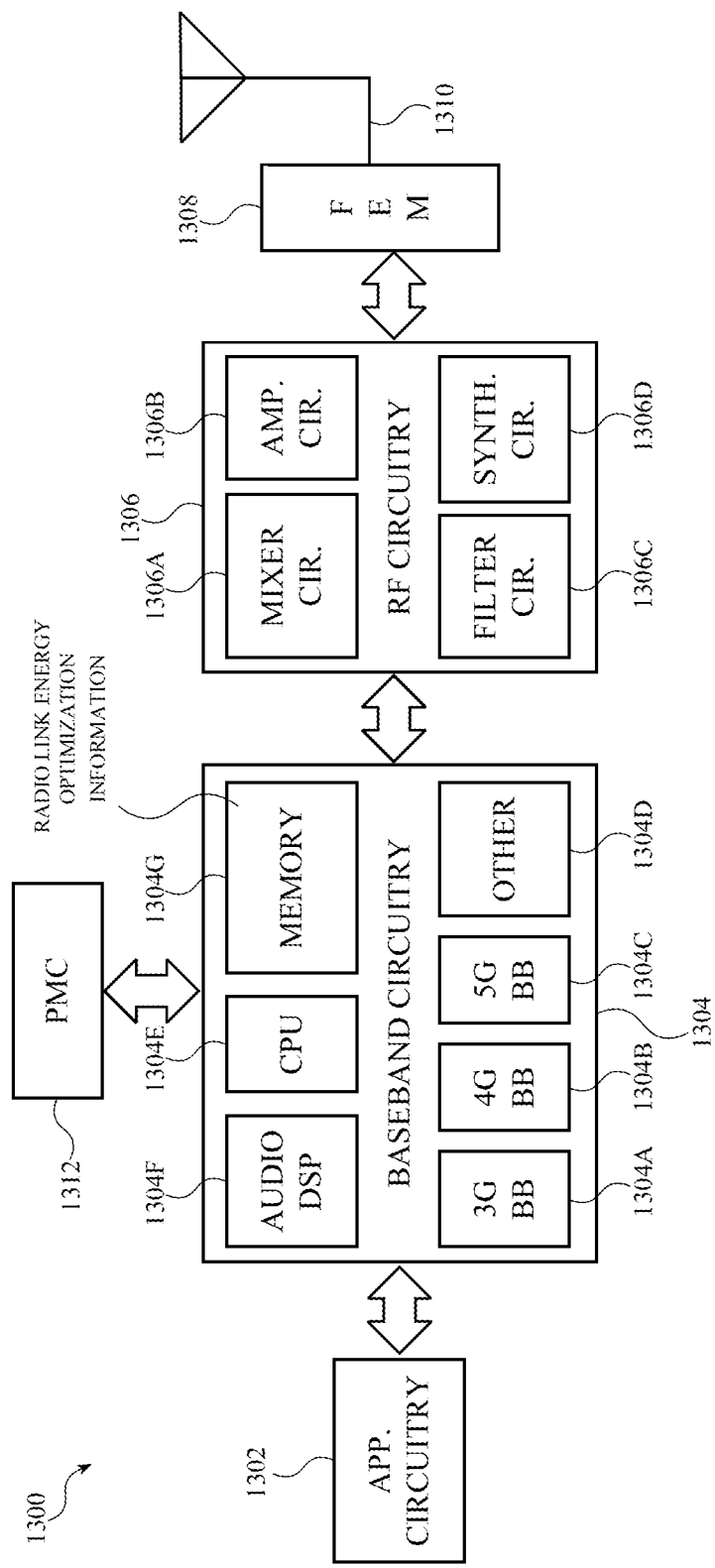
FIG. 13 is a diagram of an example of components of a device according to one or more implementations described herein.

FIG. 13 is a diagram of an example of components of a device according to one or more implementations described herein. In some implementations, the device 1300 can include application circuitry 1302, baseband circuitry 1304, RF circuitry 1306, front-end module (FEM) circuitry 1308, one or more antennas 1310, and power management circuitry (PMC) 1312 coupled together at least as shown. The components of the illustrated device 1300 can be included in a UE or a RAN node. In some implementations, the device 1300 can include fewer elements (e.g., a RAN node may not utilize application circuitry 1302, and instead include a processor/controller to process IP data received from a CN or an Evolved Packet Core (EPC)). In some implementations, the device 1300 can include additional elements such as, for example, memory/storage, display, camera, sensor (including one or more temperature sensors, such as a single temperature sensor, a plurality of temperature sensors at different locations in device 1300, etc.), or input/output (I/O) interface. In other implementations, the components described below can be included in more than one device (e.g., said circuitries can be separately included in more than one device for Cloud-RAN (C-RAN) implementations).

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1300. In some implementations, processors of application circuitry 1302 can process IP data packets received from an EPC.

The baseband circuitry 1304 can include circuitry such as, but not limited to, one or more single-core or multi-core processors. The baseband circuitry 1304 can include one or more baseband processors or control logic to process baseband signals received from a receive signal path of the RF circuitry 1306 and to generate baseband signals for a transmit signal path of the RF circuitry 1306. Baseband circuitry 1304 can interface with the application circuitry 1302 for generation and processing of the baseband signals and for controlling operations of the RF circuitry 1306. For example, in some implementations, the baseband circuitry 1304 can include a 3G baseband processor 1304A, a 4G baseband processor 1304B, a 5G baseband processor 1304C, or other baseband processor(s) 1304D for other existing generations, generations in development or to be developed in the future (e.g., 5G, 6G, etc.). The baseband circuitry 1304 (e.g., one or more of baseband processors 1304A-D) can handle various radio control functions that enable communication with one or more radio networks via the RF circuitry 1306. In other implementations, some or all of the functionality of baseband processors 1304A-D can be included in modules stored in the memory 1304G and executed via a Central Processing Unit (CPU) 1304E. The radio control functions can include, but are not limited to, signal modulation/demodulation, encoding/decoding, radio frequency shifting, etc. In some implementations, modulation/demodulation circuitry of the baseband circuitry 1304 can include Fast-Fourier Transform (FFT), preceding, or constellation mapping/de-mapping functionality. In some implementations, encoding/decoding circuitry of the baseband circuitry 1304 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1304G may store information and instructions 1455 for optimizing the power consumption of UE 210 though radio link energy optimization. The information and instructions may cause or enable UE 210 to determine an energy optimal MCS. An energy optimal MCS may include an MCS that enables reception of a data payload at a lowest total energy consumed by a receiver. In some implementations, the MCS may be based on several factors, including reception time constraints, data transfer rate constraints, and/or changes in transfer rates relative to changes in energy consumption. The information and instructions may cause or enable UE 210 to communicate the energy optimal MCS to base station 222, such that base station 222 sends a data payload to UE 210 using an energy optimal data transfer rate that is based on the energy optimal MCS.

In some implementations, the baseband circuitry 1304 can include one or more audio digital signal processor(s) (DSP) 1304F. The audio DSPs 1304F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1304 and the application circuitry 1302 can be implemented together such as, for example, on a system on a chip (SOC).

In some implementations, the baseband circuitry 1304 can provide for communication compatible with one or more radio technologies. For example, in some implementations, the baseband circuitry 1304 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various implementations, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some implementations, the receive signal path of the RF circuitry 1306 can include mixer circuitry 1306A, amplifier circuitry 1306B and filter circuitry 1306C. In some implementations, the transmit signal path of the RF circuitry 1306 can include filter circuitry 1306C and mixer circuitry 1306A. RF circuitry 1306 can also include synthesizer circuitry 1306D for synthesizing a frequency for use by the mixer circuitry 1306A of the receive signal path and the transmit signal path. In some implementations, the mixer circuitry 1306A of the receive signal path can be configured to down-convert RF signals received from the FEM circuitry 1308 based on the synthesized frequency provided by synthesizer circuitry 1306D. The amplifier circuitry 1306B can be configured to amplify the down-converted signals and the filter circuitry 1306C can be a low-pass filter (LPF) or band-pass filter (BPF) configured to remove unwanted signals from the down-converted signals to generate output baseband signals. Output baseband signals can be provided to the baseband circuitry 1304 for further processing. In some implementations, the output baseband signals can be zero-frequency baseband signals, although this is not a requirement. In some implementations, mixer circuitry 1306A of the receive signal path can comprise passive mixers, although the scope of the implementations is not limited in this respect.

In some implementations, the mixer circuitry 1306A of the transmit signal path can be configured to up-convert input baseband signals based on the synthesized frequency provided by the synthesizer circuitry 1306D to generate RF output signals for the FEM circuitry 1308. The baseband signals can be provided by the baseband circuitry 1304 and can be filtered by filter circuitry 1306C.

In some implementations, the mixer circuitry 1306A of the receive signal path and the mixer circuitry 1306A of the transmit signal path can include two or more mixers and can be arranged for quadrature down conversion and up conversion, respectively. In some implementations, the mixer circuitry 1306A of the receive signal path and the mixer circuitry 1306A of the transmit signal path can include two or more mixers and can be arranged for image rejection (e.g., Hartley image rejection). In some implementations, the mixer circuitry 1306A of the receive signal path and the mixer circuitry 1406A can be arranged for direct down conversion and direct up conversion, respectively. In some implementations, the mixer circuitry 1306A of the receive signal path and the mixer circuitry 1306A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode implementations, a separate radio IC circuitry can be provided for processing signals for each spectrum, although the scope of the implementations is not limited in this respect.

In some implementations, the synthesizer circuitry 1306D can be a fractional-N synthesizer or a fractional N/N+1 synthesizer, although the scope of the implementations is not limited in this respect as other types of frequency synthesizers can be suitable. For example, synthesizer circuitry 1306D can be a delta-sigma synthesizer, a frequency multiplier, or a synthesizer comprising a phase-locked loop with a frequency divider.

The synthesizer circuitry 1306D can be configured to synthesize an output frequency for use by the mixer circuitry 1306A of the RF circuitry 1306 based on a frequency input and a divider control input. In some implementations, the synthesizer circuitry 1306D can be a fractional N/N+1 synthesizer.

In some implementations, frequency input can be provided by a voltage-controlled oscillator (VCO), although that is not a requirement. Divider control input can be provided by either the baseband circuitry 1304 or the applications circuitry 1302 depending on the desired output frequency. In some implementations, a divider control input (e.g., N) can be determined from a look-up table based on a channel indicated by the applications circuitry 1302.

Synthesizer circuitry 1306D of the RF circuitry 1306 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1306D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310. In various implementations, the amplification through the transmit or receive signal paths can be done solely in the RF circuitry 1306, solely in the FEM circuitry 1308, or in both the RF circuitry 1306 and the FEM circuitry 1308.

In some implementations, the FEM circuitry 1308 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310).

In some implementations, the PMC 1312 can manage power provided to the baseband circuitry 1304. In particular, the PMC 1312 can control power-source selection, voltage scaling, battery charging, or DC-to-DC conversion. The PMC 1312 can often be included when the device 1300 is capable of being powered by a battery, for example, when the device is included in a UE. The PMC 1312 can increase the power conversion efficiency while providing desirable implementation size and heat dissipation characteristics.

While FIG. 13 shows the PMC 1312 coupled only with the baseband circuitry 1304. However, in other implementations, the PMC 1312 may be additionally or alternatively coupled with, and perform similar power management operations for, other components such as, but not limited to, application circuitry 1302, RF circuitry 1306, or FEM circuitry 1308.

In some implementations, the PMC 1312 can control, or otherwise be part of, various power saving mechanisms of the device 1300. For example, if the device 1300 is in an RRC_Connected state, where it is still connected to the RAN node as it expects to receive traffic shortly, then it can enter a state known as Discontinuous Reception Mode (DRX) after a period of inactivity. During this state, the device 1300 can power down for brief intervals of time and thus save power.

If there is no data traffic activity for an extended period of time, then the device 1300 can transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1302 and processors of the baseband circuitry 1304 can be used to execute elements of one or more instances of a protocol stack. For example, processors of the baseband circuitry 1304, alone or in combination, can be used execute Layer 3, Layer 2, or Layer 1 functionality, while processors of the baseband circuitry 1304 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 14:
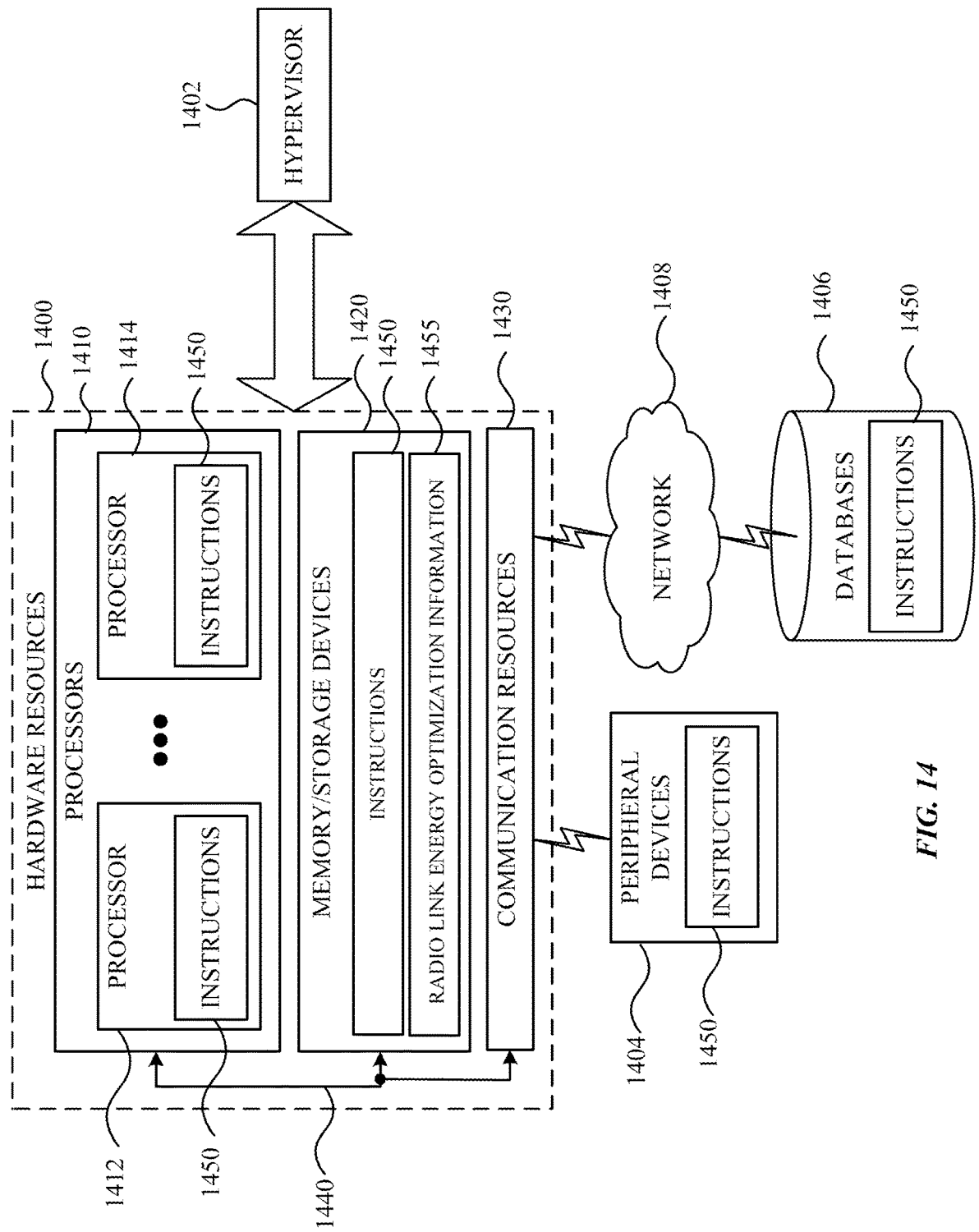
FIG. 14 is a block diagram illustrating components, according to one or more implementations described herein, able to read instructions from a machine-readable or computer-readable medium (e.g., a non-transitory machine-readable storage medium) and perform any one or more of the techniques described herein.

FIG. 14 is a block diagram illustrating components, according to some example embodiments, able to read instructions from a machine-readable or computer-readable medium (e.g., a non-transitory machine-readable storage medium) and perform any one or more of the techniques described herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor may be executed to provide an execution environment for one or more network slices/sub-slices to utilize the hardware resources 1400

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1420 may store information and instructions 1455 for optimizing the power consumption of UE 210 though radio link energy optimization. The information and instructions may cause or enable UE 210 to determine an energy optimal MCS. An energy optimal MCS may include an MCS that enables reception of a data payload at a lowest total energy consumed by a receiver. In some implementations, the MCS may be based on several factors, including reception time constraints, data transfer rate constraints, and/or changes in transfer rates relative to changes in energy consumption. The information and instructions may cause or enable UE 210 to communicate the energy optimal MCS to base station 222, such that base station 222 sends a data payload to UE 210 using an energy optimal data transfer rate that is based on the energy optimal MCS.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the example described herein, a user equipment (UE) may comprise: a memory; and one or more processors configured to, when executing instructions stored in the memory, cause the UE to: determine an energy optimal modulation and coding scheme (MCS) for receiving a downlink (DL) transmission from a base station, where a total energy consumed by the UE when receiving the DL transmission at the energy optimal MCS is lower than an energy consumed by the UE when receiving the DL transmission at a maximum available data transfer rate; communicate the energy optimal MCS to the base station; and receive, from the base station, the DL transmission at an energy optimal data transfer rate that is based on the energy optimal MCS.

In example 1, which may also include one or more of the example described herein, the energy optimal MCS comprises an MCS that causes reception of the DL transmission at a lowest total energy consumed by the UE.

In example 1, which may also include one or more of the example described herein, energy optimal MCS is based on a reception time constraint comprising a deadline by which the DL transmission is to be received.

In example 1, which may also include one or more of the example described herein, the energy optimal MCS is based on a channel condition determined by a reception energy and signal-to-noise and interference ratio (SINR) or a signal-to-noise ratio (SNR).

In example 1, which may also include one or more of the example described herein, the energy optimal MCS is based on target packet error rate (PER) or target block error rate (BLER) of the DL transmission.

In example 1, which may also include one or more of the example described herein, the UE determines an MCS corresponding to a maximum data transfer rate available when a remaining battery energy is at or above a battery energy threshold.

In example 1, which may also include one or more of the example described herein, the UE determines energy optimal MCS when the remaining battery energy is below the battery energy threshold.

In example 1, which may also include one or more of the example described herein, the energy optimal MCS comprises an MCS that causes reception of the DL transmission at data transfer rate corresponding to a receiver energy consumption rate above that of a lowest energy consumption rate but within an energy consumption rate threshold measured from the lowest energy consumption rate.

In example 1, which may also include one or more of the example described herein, the one or more processors is further to: determine an MCS based on channel conditions for the DL transmission; and determine an MCS index for the MCS based on channel conditions and the energy optimal MCS; and select the energy optimal MCS based on the energy optimal MCS having a lower MCS index.

In example 1, which may also include one or more of the example described herein, a method performed by a user equipment (UE) may comprise: determining an energy optimal modulation and coding scheme (MCS) for receiving a downlink (DL) transmission from a base station, where a total energy consumed by the UE when receiving the DL transmission at the energy optimal MCS is lower than an energy consumed by the UE when receiving the DL transmission at a maximum available data transfer rate; communicating the energy optimal MCS to the base station; and receiving, from the base station, the DL transmission at an energy optimal data transfer rate that is based on the energy optimal MCS.

In example 1, which may also include one or more of the example described herein, a non-transitory, computer-readable medium may comprise: instructions configured to cause one or more processors to: determine an energy optimal modulation and coding scheme (MCS) for receiving a downlink (DL) transmission from a base station, where a total energy consumed by the UE when receiving the DL transmission at the energy optimal MCS is lower than an energy consumed by the UE when receiving the DL transmission at a maximum available data transfer rate; communicate the energy optimal MCS to the base station; and receive, from the base station, the DL transmission at an energy optimal data transfer rate that is based on the energy optimal MCS.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
   a memory; and
   one or more processors configured to, when executing instructions stored in the memory, cause the UE to:
      determine an energy optimal modulation and coding scheme (MCS) for receiving a downlink (DL) transmission from a base station, where a total energy consumed by the UE when receiving the DL transmission at the energy optimal MCS is lower than an energy consumed by the UE when receiving the DL transmission at a maximum available data transfer rate;
      communicate the energy optimal MCS to the base station; and
      receive, from the base station, the DL transmission at an energy optimal data transfer rate that is based on the energy optimal MCS.

2. The UE of claim 1, wherein the energy optimal MCS comprises an MCS that causes reception of the DL transmission at a lowest total energy consumed by the UE.

3. The UE of claim 1, wherein the energy optimal MCS is based on a reception time constraint comprising a deadline by which the DL transmission is to be received.

4. The UE of claim 1, wherein the energy optimal MCS is based on a channel condition determined by a reception energy and signal-to-noise and interference ratio (SINR) or a signal-to-noise ratio (SNR).

5. The UE of claim 1, wherein the energy optimal MCS is based on target packet error rate (PER) or target block error rate (BLER) of the DL transmission.

6. The UE of claim 1, wherein the UE determines an MCS corresponding to a maximum data transfer rate available when a remaining battery energy is at or above a battery energy threshold.

7. The UE of claim 6, wherein the UE determines energy optimal MCS when the remaining battery energy is below the battery energy threshold.

8. The UE of claim 1, wherein the energy optimal MCS comprises an MCS that causes reception of the DL transmission at data transfer rate corresponding to a receiver energy consumption rate above that of a lowest energy consumption rate but within an energy consumption rate threshold measured from the lowest energy consumption rate.

9. The UE of claim 1, wherein the one or more processors is further to:
   determine an MCS based on channel conditions for the DL transmission; and
   determine an MCS index for the MCS based on channel conditions and the energy optimal MCS; and
   select the energy optimal MCS based on the energy optimal MCS having a lower MCS index.

10. A method performed by a user equipment (UE), the method comprising:
    determining an energy optimal modulation and coding scheme (MCS) for receiving a downlink (DL) transmission from a base station, where a total energy consumed by the UE when receiving the DL transmission at the energy optimal MCS is lower than an energy consumed by the UE when receiving the DL transmission at a maximum available data transfer rate;
    communicating the energy optimal MCS to the base station; and
    receiving, from the base station, the DL transmission at an energy optimal data transfer rate that is based on the energy optimal MCS.

11. The method of claim 10, wherein the energy optimal MCS comprises an MCS that causes reception of the DL transmission at a lowest total energy consumed by the UE.

12. The method of claim 10, wherein the energy optimal MCS is based on a reception time constraint comprising a deadline by which the DL transmission is to be received.

13. The method of claim 10, wherein the energy optimal MCS is based on a channel condition determined by a reception energy and signal-to-noise and interference ratio (SINR) or a signal-to-noise ratio (SNR).

14. The method of claim 10, wherein the energy optimal MCS is based on target packet error rate (PER) or target block error rate (BLER) of the DL transmission.

15. The method of claim 10, wherein the UE determines an MCS corresponding to a maximum data transfer rate available when a remaining battery energy is at or above a battery energy threshold.

16. The method of claim 15, wherein the UE determines energy optimal MCS when the remaining battery energy is below the battery energy threshold.

17. The method of claim 10, wherein the energy optimal MCS comprises an MCS that causes reception of the DL transmission at data transfer rate corresponding to a receiver energy consumption rate above that of a lowest energy consumption rate but within an energy consumption rate threshold measured from the lowest energy consumption rate.

18. A non-transitory, computer-readable medium comprising:
   instructions configured to cause one or more processors to:
      determine an energy optimal modulation and coding scheme (MCS) for receiving a downlink (DL) transmission from a base station, where a total energy consumed by a user equipment (UE) when receiving the DL transmission at the energy optimal MCS is lower than an energy consumed by the UE when receiving the DL transmission at a maximum available data transfer rate;
      communicate the energy optimal MCS to the base station; and
      receive, from the base station, the DL transmission at an energy optimal data transfer rate that is based on the energy optimal MCS.

19. The non-transitory, computer-readable medium of claim 18, wherein the energy optimal MCS comprises an MCS that causes reception of the DL transmission at a lowest total energy consumed by the UE.

20. The non-transitory, computer-readable medium of claim 18, wherein the energy optimal MCS is based on a reception time constraint comprising a deadline by which the DL transmission is to be received.

* * * * *